(12) United States Patent
Torigoshi et al.

(10) Patent No.: US 9,959,402 B2
(45) Date of Patent: May 1, 2018

(54) IMAGE PROCESSING SYSTEM, IMAGE FORMATION APPARATUS, AND RELAY DEVICE

(71) Applicant: Konica Minolta, Inc., Chiyoda-ku, Tokyo (JP)

(72) Inventors: Akihiro Torigoshi, Itami (JP); Kazumi Sawayanagi, Itami (JP); Noriaki Asamoto, Kusatsu (JP); Masami Yamada, Osaka (JP); Shuji Yoneda, Osaka (JP); Hisashi Uchida, Kyoto (JP); Kazuya Anezaki, Itami (JP); Yasutaka Ito, Amagasaki (JP)

(73) Assignee: KONICA MINOLTA INC., Tokyo (JP)

( * ) Notice: Subject to any disclaimer, the term of this patent is extended or adjusted under 35 U.S.C. 154(b) by 0 days. days.

(21) Appl. No.: 14/508,215

(22) Filed: Oct. 7, 2014

(65) Prior Publication Data
US 2015/0101039 A1  Apr. 9, 2015

(30) Foreign Application Priority Data
Oct. 9, 2013  (JP) ................................ 2013-212023

(51) Int. Cl.
*H04L 29/06* (2006.01)
*G06F 21/44* (2013.01)
(Continued)

(52) U.S. Cl.
CPC ............ *G06F 21/44* (2013.01); *G06F 21/608* (2013.01); *H04L 63/101* (2013.01); *G06T 1/0007* (2013.01)

(58) Field of Classification Search
CPC ........ G06F 21/44; G06F 21/608; G06F 13/10; H04L 63/101; G06T 1/0007
(Continued)

(56) References Cited

U.S. PATENT DOCUMENTS

| 6,571,147 B1 * | 5/2003 | Kashihara | .............. G06Q 10/04 |
| | | | 700/100 |
| 8,189,225 B1 * | 5/2012 | Lo | ........................... G06F 3/122 |
| | | | 358/1.15 |

(Continued)

FOREIGN PATENT DOCUMENTS

| JP | 2012-138078 A | 7/2012 |
| JP | 2013-65114 A | 4/2013 |

(Continued)

OTHER PUBLICATIONS

Japanese Notice of Grounds of Rejection corresponding to Patent Application No. 2013-212023; dated Sep. 8, 2015, with English translation.

*Primary Examiner* — David García Cervetti
(74) *Attorney, Agent, or Firm* — Cantor Colburn LLP

(57) ABSTRACT

An MFP sets an access condition for an external device with respect to a cloud box. The access condition is transmitted from the MFP to a relay device, and is registered in a memory of the relay device. When the relay device receives an access request made by the external device with respect to the MFP serving as an internal device, the relay device determines whether to permit or deny access to the MFP by comparing the access request with the access condition. When the access is permitted, the access request is transferred from the relay device to the MFP, whereas when the access is denied, the relay device notifies the external device of it.

8 Claims, 22 Drawing Sheets

(51) Int. Cl.
*G06F 21/60* (2013.01)
*G06T 1/00* (2006.01)

(58) Field of Classification Search
USPC ............. 726/17, 11, 4, 7; 713/153, 156, 186
See application file for complete search history.

(56) References Cited

U.S. PATENT DOCUMENTS

| | | | | |
|---|---|---|---|---|
| 8,988,716 B1* | 3/2015 | Odean | ................... | G06F 3/1238 358/1.14 |
| 9,626,137 B2* | 4/2017 | Mihara | ................ | G06F 3/1222 |
| 9,710,735 B2* | 7/2017 | Mochizuki | ......... | G06K 15/1806 |
| 2001/0038742 A1* | 11/2001 | Takano | ................ | G11B 27/031 386/241 |
| 2002/0018248 A1* | 2/2002 | Ohhashi | ............. | H04N 1/00843 358/474 |
| 2002/0062397 A1* | 5/2002 | Chang | ................... | G06F 3/1204 709/246 |
| 2005/0041596 A1* | 2/2005 | Yokomitsu | ........ | H04L 29/12283 370/252 |
| 2006/0101169 A1* | 5/2006 | Shiga | .................... | G06F 3/0607 710/36 |
| 2007/0022222 A1* | 1/2007 | Wu | ...................... | G06F 12/1433 710/13 |
| 2007/0177777 A1* | 8/2007 | Funahashi | ............... | G06F 21/32 382/124 |
| 2007/0233983 A1* | 10/2007 | Tanaka | ................... | G06F 3/0622 711/163 |
| 2009/0303524 A1* | 12/2009 | Kanekawa | ............ | G06F 9/5038 358/1.15 |
| 2009/0316189 A1* | 12/2009 | Yamauchi | ............ | G06F 21/608 358/1.15 |
| 2010/0149572 A1* | 6/2010 | St. Jacques, Jr. | .. | H04N 1/00244 358/1.13 |
| 2010/0253975 A1* | 10/2010 | Ida | ........................ | G06F 21/608 358/1.15 |
| 2011/0113210 A1* | 5/2011 | Klapman | .......... | G06F 17/30091 711/163 |
| 2011/0199640 A1* | 8/2011 | Shirai | .................... | G06F 3/1204 358/1.15 |
| 2011/0299117 A1* | 12/2011 | Hashimoto | ........... | G06F 1/3203 358/1.15 |
| 2011/0317176 A1* | 12/2011 | Isshiki | ................... | G06F 3/1205 358/1.2 |
| 2012/0033257 A1* | 2/2012 | Okazawa | ............ | H04L 41/0803 358/1.15 |
| 2012/0050796 A1* | 3/2012 | Yokokura | ............... | G06F 3/121 358/1.15 |
| 2012/0062946 A1* | 3/2012 | Kitagata | ............... | G06F 3/1204 358/1.15 |
| 2012/0079571 A1* | 3/2012 | Evan | ................... | G06F 21/6209 726/6 |
| 2012/0092688 A1* | 4/2012 | Pangrazio, III | ....... | G06F 3/1206 358/1.13 |
| 2012/0096399 A1* | 4/2012 | Pangrazio, III | ....... | G06F 3/1205 715/810 |
| 2012/0127506 A1* | 5/2012 | Young | ................... | G06F 3/1206 358/1.14 |
| 2012/0127507 A1* | 5/2012 | Young | ................... | G06F 3/122 358/1.14 |
| 2012/0167197 A1 | 6/2012 | Kruger et al. | | |
| 2012/0229838 A1* | 9/2012 | Mogaki | ................. | G06F 21/608 358/1.14 |
| 2013/0003106 A1* | 1/2013 | Nishida | ................ | G06F 3/1222 358/1.14 |
| 2013/0021647 A1* | 1/2013 | Ozaki | ................... | G06F 3/1204 358/1.15 |
| 2013/0027726 A1* | 1/2013 | Yamada | ................ | G06K 15/405 358/1.13 |
| 2013/0033721 A1* | 2/2013 | Miyamoto | ............ | G06F 3/1285 358/1.14 |
| 2013/0046970 A1* | 2/2013 | Abe | ...................... | H04L 63/168 713/152 |
| 2013/0070288 A1* | 3/2013 | Muranaka | ............ | G06F 3/1204 358/1.15 |
| 2013/0074160 A1 | 3/2013 | Nakamura et al. | | |
| 2013/0083353 A1* | 4/2013 | Nishikawa | ............ | G06F 3/1206 358/1.15 |
| 2013/0120767 A1* | 5/2013 | Mandel | ................ | G06F 17/248 358/1.6 |
| 2013/0120770 A1* | 5/2013 | Mandel | ................ | G06Q 10/10 358/1.9 |
| 2013/0141747 A1* | 6/2013 | Oba | ....................... | G06F 3/1292 358/1.14 |
| 2013/0145447 A1* | 6/2013 | Maron | ................... | G06F 21/31 726/6 |
| 2013/0148155 A1* | 6/2013 | Kitagata | ............... | G06F 3/1294 358/1.15 |
| 2013/0159733 A1* | 6/2013 | Lee | ............................ | H04L 9/08 713/193 |
| 2013/0163031 A1* | 6/2013 | Tanaka | .................. | G06F 3/1203 358/1.14 |
| 2013/0188214 A1* | 7/2013 | Krajicek | ............... | G06F 3/1204 358/1.14 |
| 2013/0201518 A1* | 8/2013 | Pan | ........................ | G06F 3/1204 358/1.15 |
| 2013/0204996 A1* | 8/2013 | Takazawa | ............... | H04L 41/08 709/223 |
| 2013/0215460 A1* | 8/2013 | Eguchi | ................. | G06K 15/405 358/1.15 |
| 2013/0222827 A1* | 8/2013 | Watanabe | ............... | G06F 3/122 358/1.13 |
| 2013/0222837 A1* | 8/2013 | Watanabe | ............. | G06F 3/1222 358/1.14 |
| 2013/0235418 A1* | 9/2013 | Tanaka | ............... | H04N 1/00228 358/1.15 |
| 2013/0242334 A1* | 9/2013 | Ichida | ................... | G06F 3/1222 358/1.14 |
| 2013/0242335 A1* | 9/2013 | Naitoh | ................. | G06K 15/405 358/1.14 |
| 2013/0258387 A1* | 10/2013 | Hashimoto | ........ | G06K 15/4045 358/1.14 |
| 2013/0321861 A1* | 12/2013 | Ishihara | ................ | G06F 3/1224 358/1.15 |
| 2013/0342865 A1* | 12/2013 | Shekher | ............. | G06K 15/4045 358/1.14 |
| 2013/0342866 A1* | 12/2013 | Hansen | ................ | H04N 1/4413 358/1.14 |
| 2014/0022586 A1* | 1/2014 | Zehler | ................... | G06F 21/608 358/1.14 |
| 2014/0068429 A1* | 3/2014 | Belbin | ................... | G06F 17/212 715/273 |
| 2014/0122877 A1* | 5/2014 | Sato | ...................... | H04L 9/0894 713/168 |
| 2014/0123236 A1* | 5/2014 | Hirata | ................. | H04L 63/0807 726/4 |
| 2014/0211234 A1* | 7/2014 | Malik | ................... | H04N 1/4413 358/1.14 |
| 2014/0226174 A1* | 8/2014 | Pizot | ...................... | H04L 61/10 358/1.14 |
| 2014/0233058 A1* | 8/2014 | Aritomi | ................ | G06F 3/1292 358/1.15 |
| 2014/0237580 A1* | 8/2014 | Kato | ........................ | H04L 63/08 726/9 |
| 2014/0240748 A1* | 8/2014 | Ohno | ................... | G06F 3/1273 358/1.14 |
| 2014/0240755 A1* | 8/2014 | Pizot | ................... | G06F 11/3013 358/1.15 |
| 2014/0253944 A1* | 9/2014 | Neville | ............... | H04N 1/00127 358/1.14 |
| 2014/0253945 A1* | 9/2014 | Neville | ............... | H04L 63/083 358/1.14 |
| 2014/0253954 A1* | 9/2014 | Neville | ................. | G06F 3/1285 358/1.15 |
| 2014/0253955 A1* | 9/2014 | Neville | ................. | G06F 3/1209 358/1.15 |

(56) References Cited

U.S. PATENT DOCUMENTS

| | | | | |
|---|---|---|---|---|
| 2014/0253956 A1* | 9/2014 | Neville | | G06F 3/1209 358/1.15 |
| 2014/0253958 A1* | 9/2014 | Neville | | G06F 3/1285 358/1.15 |
| 2014/0253959 A1* | 9/2014 | Neville | | G06K 15/4045 358/1.15 |
| 2014/0253960 A1* | 9/2014 | Neville | | H04L 63/0227 358/1.15 |
| 2014/0253961 A1* | 9/2014 | Neville | | G06F 3/1209 358/1.15 |
| 2014/0253962 A1* | 9/2014 | Neville | | G06F 3/1209 358/1.15 |
| 2014/0293313 A1* | 10/2014 | Kakapuri | | G06F 3/1222 358/1.14 |
| 2014/0313539 A1* | 10/2014 | Kawano | | G06F 21/44 358/1.14 |
| 2014/0320883 A1* | 10/2014 | Ichida | | G07F 17/26 358/1.14 |
| 2014/0340717 A1* | 11/2014 | Meiyappan | | H04N 1/32432 358/400 |
| 2014/0368859 A1* | 12/2014 | Gutnik | | G06F 3/1206 358/1.14 |
| 2014/0368865 A1* | 12/2014 | Gutnik | | G06F 3/1222 358/1.15 |
| 2015/0009527 A1* | 1/2015 | Mochizuki | | G06K 15/1806 358/1.15 |
| 2015/0015908 A1* | 1/2015 | Tanaka | | G06K 15/4095 358/1.14 |
| 2015/0055176 A1* | 2/2015 | Ochi | | G06F 3/1285 358/1.15 |
| 2015/0070719 A1* | 3/2015 | Kuribara | | G06F 3/1203 358/1.13 |
| 2015/0092221 A1* | 4/2015 | Ochi | | G06F 3/1222 358/1.14 |
| 2015/0101025 A1* | 4/2015 | Murata | | G06F 21/10 726/4 |
| 2015/0153980 A1* | 6/2015 | Ito | | G06F 3/1236 358/1.14 |
| 2015/0161487 A1* | 6/2015 | Nishida | | G06F 3/1215 358/1.15 |
| 2015/0199161 A1* | 7/2015 | Gutnik | | G06F 3/1296 358/1.15 |

FOREIGN PATENT DOCUMENTS

| | | |
|---|---|---|
| JP | 2013-106119 A1 | 5/2013 |
| WO | 2012053135 A1 | 4/2012 |

* cited by examiner

FIG.5

| CHECK BOX | CHECK JOB | | |
|---|---|---|---|
| BOX | USER | | |
| BOX 1 | A | SETTING | |
| | B | SETTING | |
| BOX 2 | C | SETTING | |
| BOX 3 | CLOUD | SETTING | |
| BOX 4 | | | |
| ⋮ | ⋮ | ⋮ | |

FIG.9

```
CLOUD BOX: CLOUD ACCESS CONDITION

CLOUD SERVICE
NAME            [                    ]

ORGANIZATION
SECTION NAME    [                    ]

USER NAME       [                    ]

TIME            [  ]:[  ] ~ [  ]:[  ]
```

FIG.10

DOCUMENT A: DOCUMENT ACCESS CONDITION

ACCESS　　　　● PERMIT　　　○ DENY

CLOUD SERVICE NAME

ORGANIZATION SECTION NAME

USER NAME

TIME　　□ : □ ~ □ : □

FIG.13

| | CLOUD SERVICE NAME | ORGANIZATION SECTION NAME | USER NAME | TIME PERIOD |
|---|---|---|---|---|
| CLOUD ACCESS CONDITION | AB FILE OBTAINING APPLICATION | ABC DEVELOPMENT SECTION, KKK PLANNING SECTION, YYY MANAGEMENT SECTION | user1,user2,puser1,puser2 | 8:00~17:00 |
| LOCAL ACCESS CONDITION | — | ABC DEVELOPMENT SECTION, KKK PLANNING SECTION, YYY MANAGEMENT SECTION | user1,user2,puser1,puser2,puser3 | — |

FIG.14

| MFP NAME | CLOUD SERVICE NAME | ORGANIZATION SECTION NAME | USER NAME | TIME PERIOD |
|---|---|---|---|---|
| MFP-1 | AB FILE OBTAINING APPLICATION | — | user1,user1,puser1,puser2 | 8:00~17:00 |
| MFP-2 | AB FILE OBTAINING APPLICATION | ABC DEVELOPMENT SECTION, KKK PLANNING SECTION, YYY MANAGEMENT SECTION | user1,user2,puser1, puser2,puser3 | 8:00~17:00 |
| MFP-3 | | | | |
| MFP-4 | CD FILE OBTAINING APPLICATION | ABC DEVELOPMENT SECTION | user1,user2 | 8:00~17:00 |

FIG.15

| MFP NAME | DOCUMENT NAME | CLOUD SERVICE NAME | ORGANIZATION SECTION NAME | USER NAME | TIME PERIOD |
|---|---|---|---|---|---|
| MFP-1 | DOCUMENT A | — | ABC DEVELOPMENT SECTION | user1,puser1 | — |
| | DOCUMENT B | — | KKK PLANNING SECTION | user1,puser2 | 12:00~17:00 |
| | DOCUMENT C | — | YYY MANAGEMENT SECTION | user2,puser3 | — |
| MFP-2 | DOCUMENT A | AB FILE OBTAINING APPLICATION | — | — | — |
| | DOCUMENT B | CD FILE OBTAINING APPLICATION | — | user2 | — |

IMAGE PROCESSING SYSTEM, IMAGE FORMATION APPARATUS, AND RELAY DEVICE

This application is based on Japanese Patent Application No. 2013-212023 filed with the Japan Patent Office on Oct. 9, 2013, the entire content of which is hereby incorporated by reference.

BACKGROUND OF THE INVENTION

Field of the Invention

The present invention relates to an image processing system, an image formation apparatus, and a relay device. In particular, the present invention relates to an image processing system, an image formation apparatus, and a relay device, each of which is capable of using a service on the Internet.

Description of the Related Art

In a corporate network including image formation apparatuses such as MFPs (Multi-Functional Peripherals), a service on the Internet (also referred to as "cloud service") has begun to be usable. Each device in such a corporate network is usually assigned with a private IP address. In this case, the device in the network cannot communicate with an external device through the Internet. To address this, the corporate network includes a relay device for relaying connection between the network and the service on the Internet.

When an external device uses an image formation apparatus included in the corporate network through the Internet, the relay device makes a request to a server on the Internet for connection thereto. With this, while maintaining the connection established between the relay device and the server, a request (job) to the image formation apparatus is transferred from the external device to the server. The server transmits the job to the relay device, and the relay device receives the job and transfers it to the image formation apparatus. Accordingly, the job is executed in the image formation apparatus.

Due to the accessibility of the external device to the device in the corporate network through the Internet as described above, security needs to be more intensified. For example, when access from an external device to a certain device is intended to be denied but the device can communicate with the relay device that maintains the communication with the above-described server, the device cannot determine whether the access request is from the external device or the access request is from other devices included in the corporate network. Accordingly, access from an unintended external device may be permitted, disadvantageously.

To address such a problem, a technique of setting an access condition with respect to the relay device is considered. Accordingly, whether to permit or deny access from an external device can be determined at the relay device side.

However, in this technique, information for setting, such as the ID or IP address of an external device to be permitted or denied in access, needs to be obtained, which requires time and effort for settings, disadvantageously.

SUMMARY OF THE INVENTION

The present disclosure has an object to provide an image processing system, an image formation apparatus, and a relay device, each of which can readily ensure security and is connectable to an external device through the Internet.

According to one embodiment, an image processing system includes: an image formation apparatus; and a relay unit for relaying communication between the image formation apparatus and an external device external to the image processing system, and the image processing system further includes: a setting unit for setting an access condition for the external device with respect to a memory region accessible by other devices, included in the image formation apparatus; a registration unit for registering the access condition in a memory; a request input unit for receiving an access request, the access request being made by the external device with respect to an internal device, which is a device included in the image processing system; a determination unit for determining whether to permit or deny access to the image formation apparatus by comparing the access request with the access condition when the access request is a request for access to the image formation apparatus; a transfer unit for transferring the access request to the image formation apparatus when the determination unit determines to permit the access from the external device; and a notification unit for notifying the external device that the access has been denied when the determination unit determines to deny the access from the external device.

According to another embodiment, an image formation apparatus includes: a memory region accessible by other devices; a first setting unit for setting at least one first access condition, which is used for access to the memory region accessible by an external device, the external device being not included in a system to which the image formation apparatus belongs; and a transmission unit for transmitting the first access condition to a relay device included in the system for relaying communication between an internal device in the system and the external device.

Preferably, the image formation apparatus further includes: a second setting unit for setting at least one second access condition, which is used for access to the memory region accessible by the internal device; and a determination unit for determining whether to permit or deny access to the predetermined memory region by comparing an access request from another device with the second access condition.

More preferably, the transmission unit transmits an access condition, not included in the second access condition, of the first access condition to the relay device.

Preferably, the image formation apparatus further includes a third setting unit for setting at least one third access condition, which is used for access to a document stored in the memory region, wherein the transmission unit further transmits the third access condition to the relay device.

More preferably, the third setting unit includes an input unit for receiving input of at least one access condition from a user, and when each access condition input from the user is included in the first access condition, the third setting unit sets the access condition input from the user as the third access condition.

According to another embodiment, a relay device is a relay device for relaying communication between at least one internal device included in a system to which the relay device belongs and an external device not included in the system, and the relay device includes: a first registration unit for registering at least one first access condition in a memory, the first access condition being received from an image formation apparatus serving as the internal device, the first access condition being used for access to a memory region accessible by other devices of the image formation apparatus; a request input unit for receiving an access request made by the external device with respect to the internal device; a determination unit for determining whether to permit or deny access to the image formation apparatus by comparing the access request with the first access condition when the access request is a request for access to the image formation apparatus; a transfer unit for transferring the access request to the image formation apparatus when the determination unit determines to permit the access from the external device; and a notification unit for notifying the external device that the access has been denied when the determination unit determines to deny the access from the external device.

Preferably, the relay device further includes a second registration unit for registering at least one second access condition in the memory, the second access condition being received from an image formation apparatus serving as the internal device, the second access condition being used for access to a document stored in the memory region, wherein when the second access condition with respect to the document designated by the access request is registered in the memory, the determination unit determines to permit or deny the access to the image formation apparatus by comparing the access request with the second access condition.

Preferably, the relay device further includes a second registration unit for registering at least one second access condition in the memory, the second access condition being received from an image formation apparatus serving as the internal device, the second access condition being used for access to a document stored in the memory region, wherein when the determination unit determines that the first access condition is satisfied by comparing the access request, which is a request for access to the image formation apparatus, with the first access condition, the determination unit further determines whether to permit or deny the access from the external device by comparing the access request with the second access condition.

Preferably, the second registration unit registers the second access condition in the memory when each second access condition is included in the first access condition.

According to another embodiment, the image formation apparatus includes the relay device described above.

According to another embodiment, a non-transitory computer-readable storage medium stores a program causing an image formation apparatus to perform an access management process for an external device not included in a system to which the image formation apparatus belongs. The image forming apparatus includes a memory region accessible by other devices. The program causes the image formation apparatus to perform the steps of: setting at least one first access condition, which is used for access to the memory region; and transmitting the first access condition to a relay device included in the system for relaying communication between an internal device included in the system and the external device.

According to another embodiment, a non-transitory computer-readable storage medium stores a program causing a computer, which serves as a relay device, to perform an access management process. The relay device relays communication between at least one internal device included in a system to which the relay device belongs and an external device not included in the system, the program causing the computer to perform the steps of: registering at least one first access condition in a memory, the first access condition being received from an image formation apparatus serving as the internal device, the first access condition being used for access to a memory region accessible by other devices of the image formation apparatus; receiving an access request made by the external device with respect to the internal device; determining whether to permit or deny access to the image formation apparatus by comparing the access request with the first access condition when the access request is a request for access to the image formation apparatus; and transferring the access request to the image formation apparatus when it is determined to permit the access from the external device, and notifying the external device that the access has been denied when it is determined to deny the access from the external device.

The foregoing and other objects, features, aspects and advantages of the present invention will become more apparent from the following detailed description of the present invention when taken in conjunction with the accompanying drawings.

Figure 4:
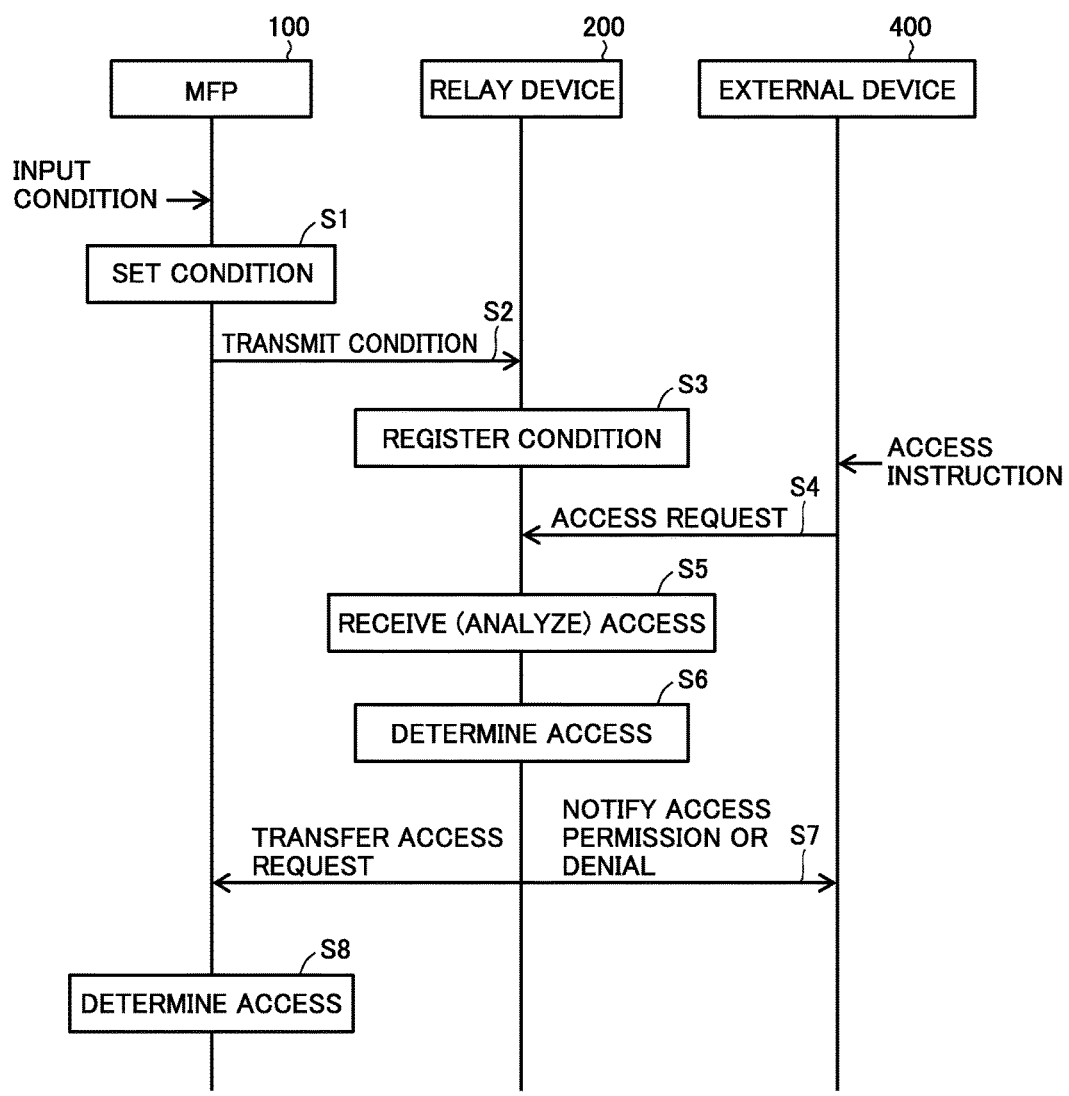
FIG. 4 shows an overview of an operation in the present system.

Each of FIG. 5 to FIG. 10 shows a specific example of a display screen in the MFP when setting an access condition in a step S1 in FIG. 4.

Figure 11:
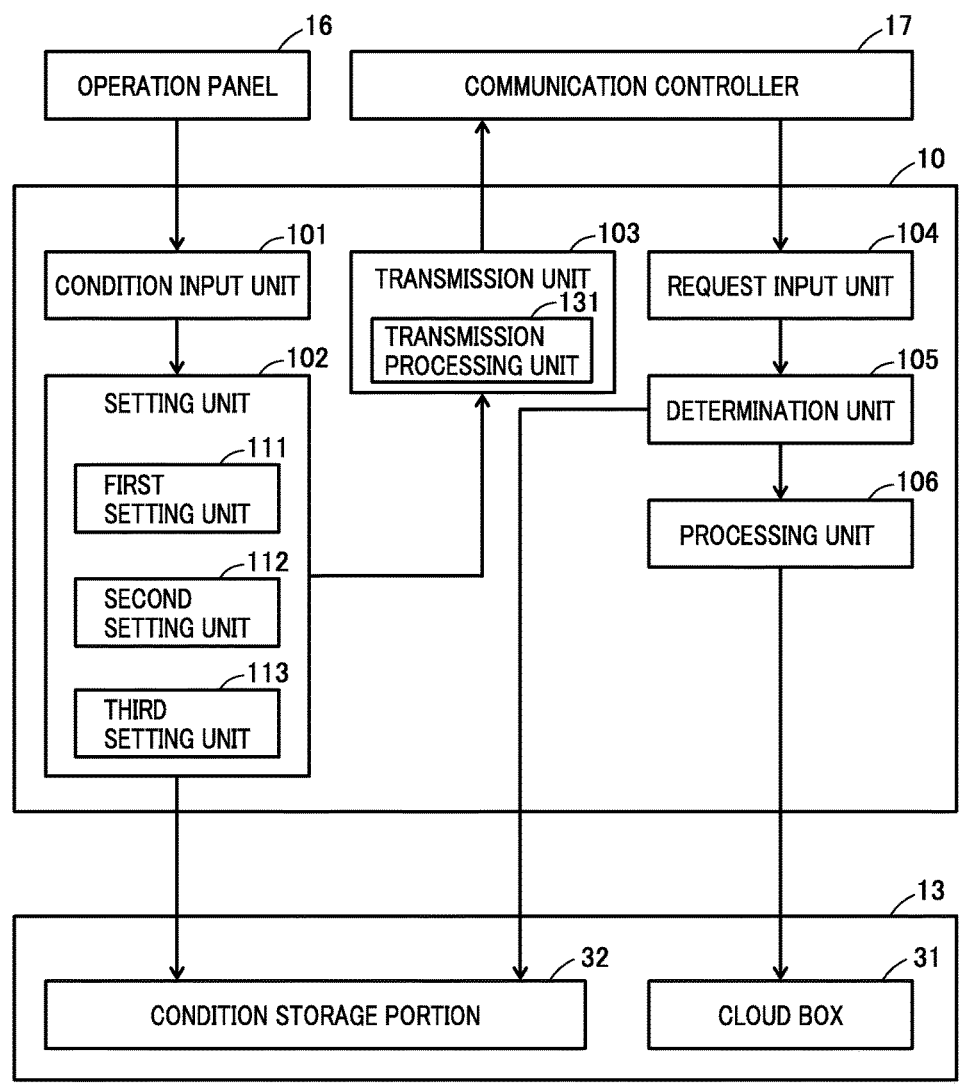

FIG. 11 is a block diagram showing a specific example of a function configuration of the MFP.

Figure 12:
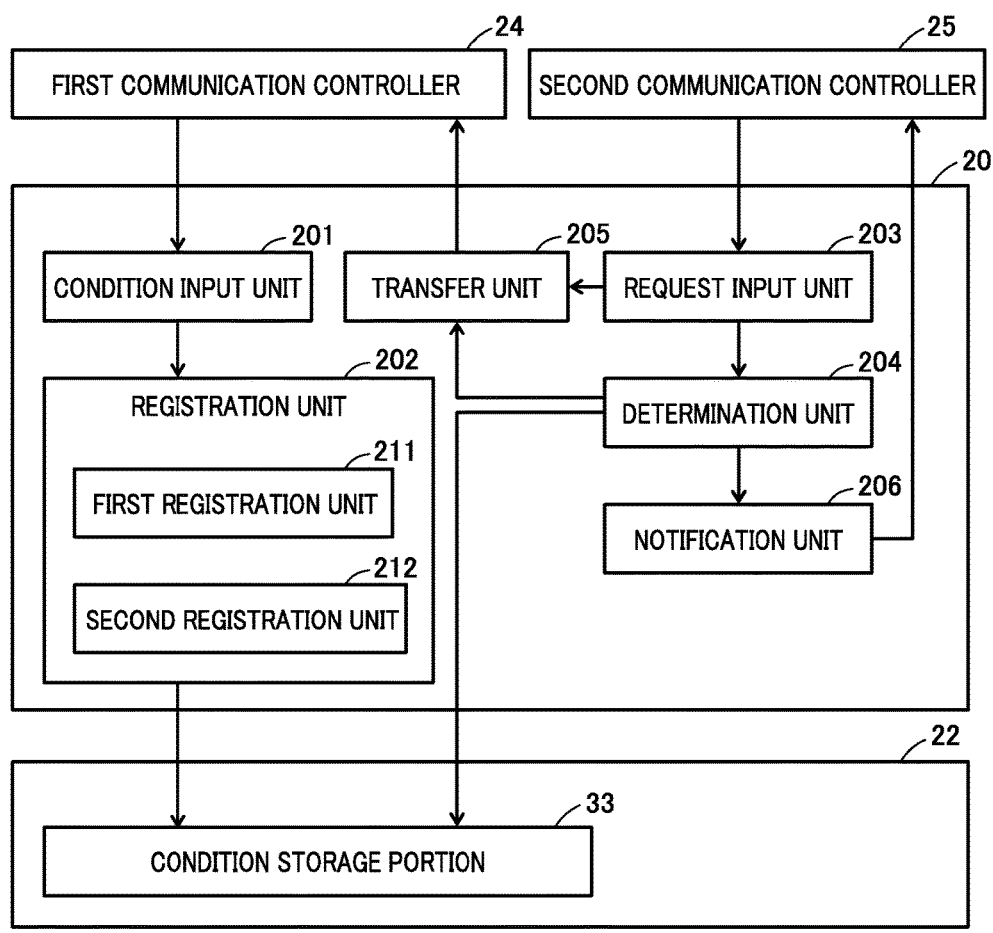

FIG. 12 is a block diagram showing a specific example of a function configuration of the relay device.

FIG. 13 shows a specific example of an access condition stored in a condition storage portion of the MFP.

FIG. 14 shows a specific example of a cloud access condition stored in a condition storage portion of the relay device.

FIG. 15 shows a specific example of a document access condition stored in the condition storage portion of the relay device.

Figure 16:
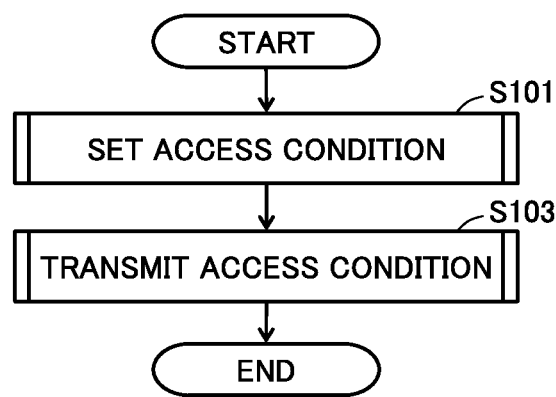

FIG. 16 is a flowchart showing a flow of process when setting an access condition in the MFP.

Figure 17:
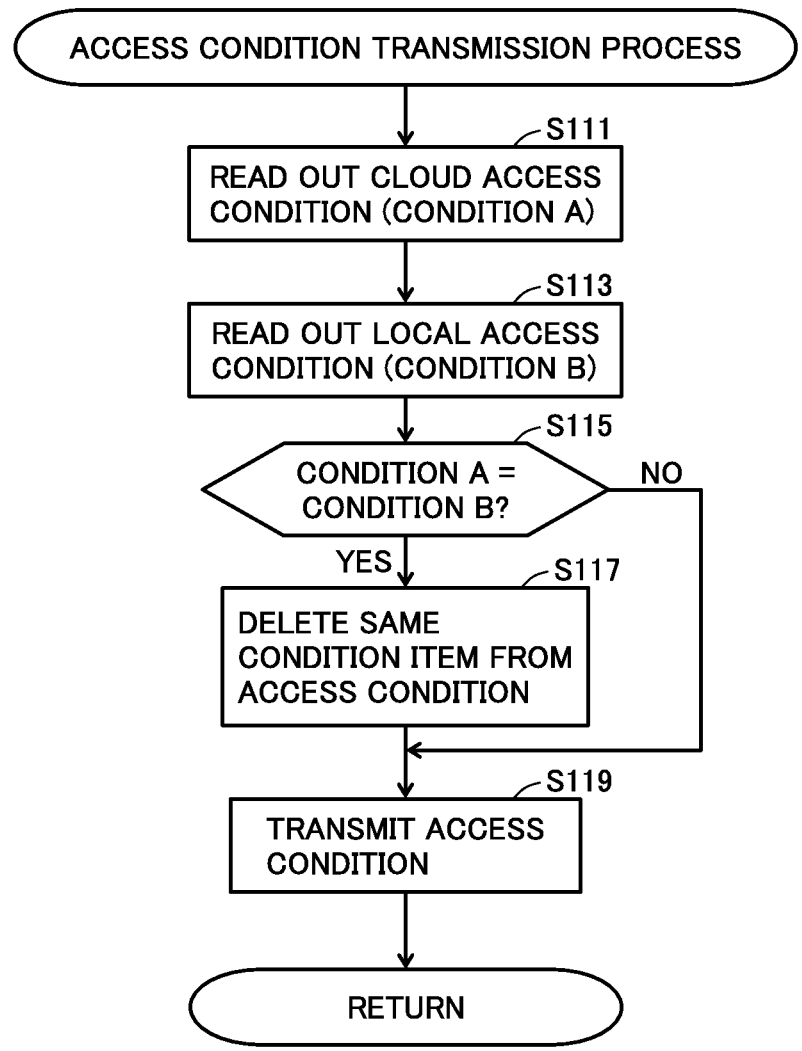

FIG. 17 is a flowchart showing a flow of operation in a step S103 shown in FIG. 16.

Figure 18:
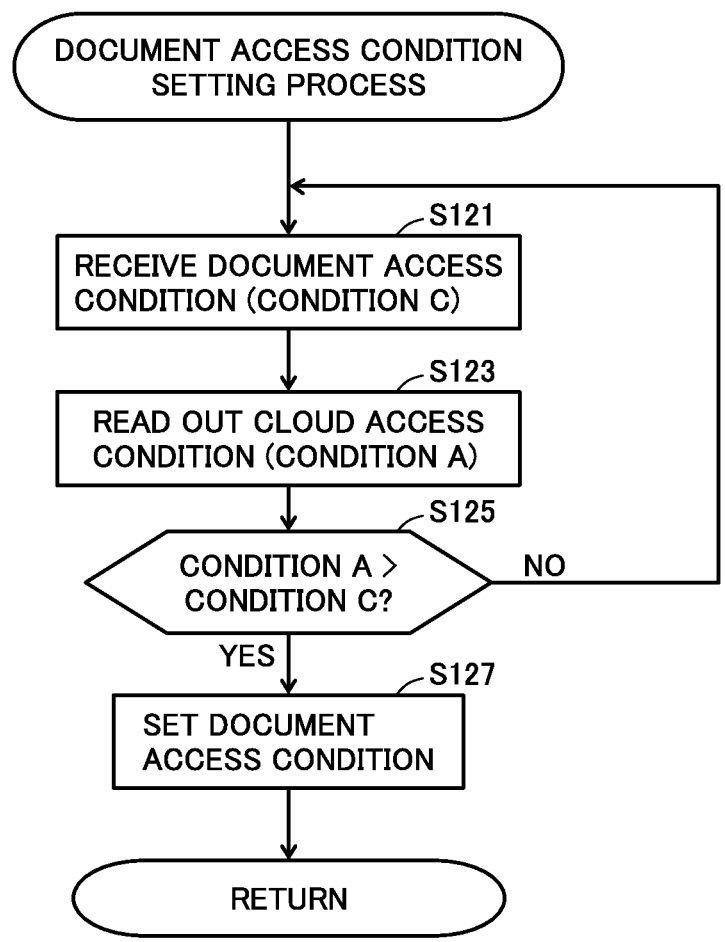

FIG. 18 is a flowchart showing a flow of process when setting the document access condition in a step S101 shown in FIG. 16.

Figure 19:
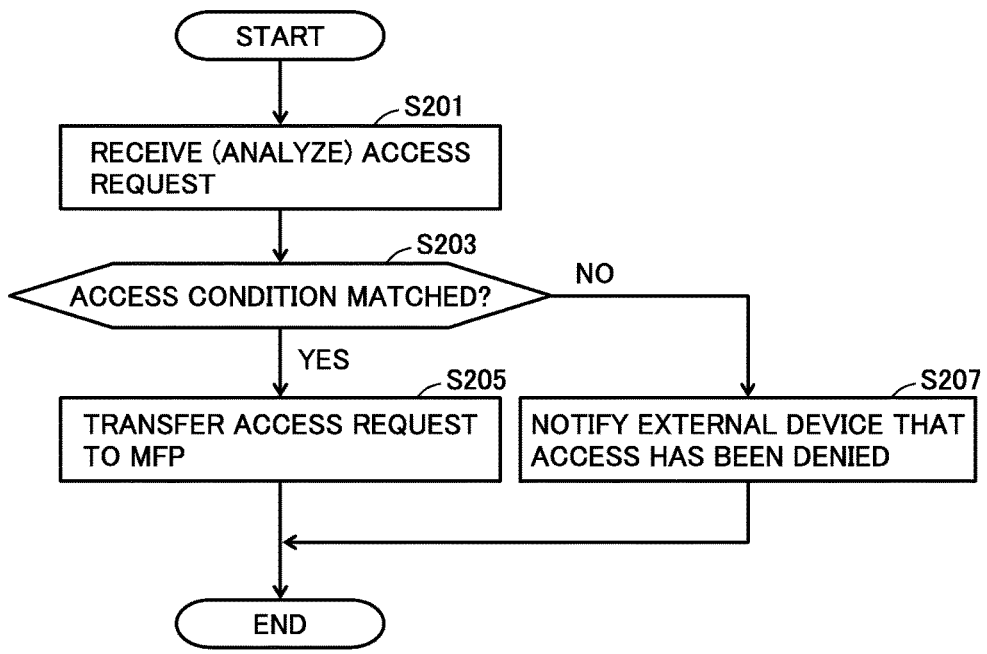

FIG. 19 is a flowchart showing a flow of process performed by the relay device in response to an access request from the external device.

Figure 20:
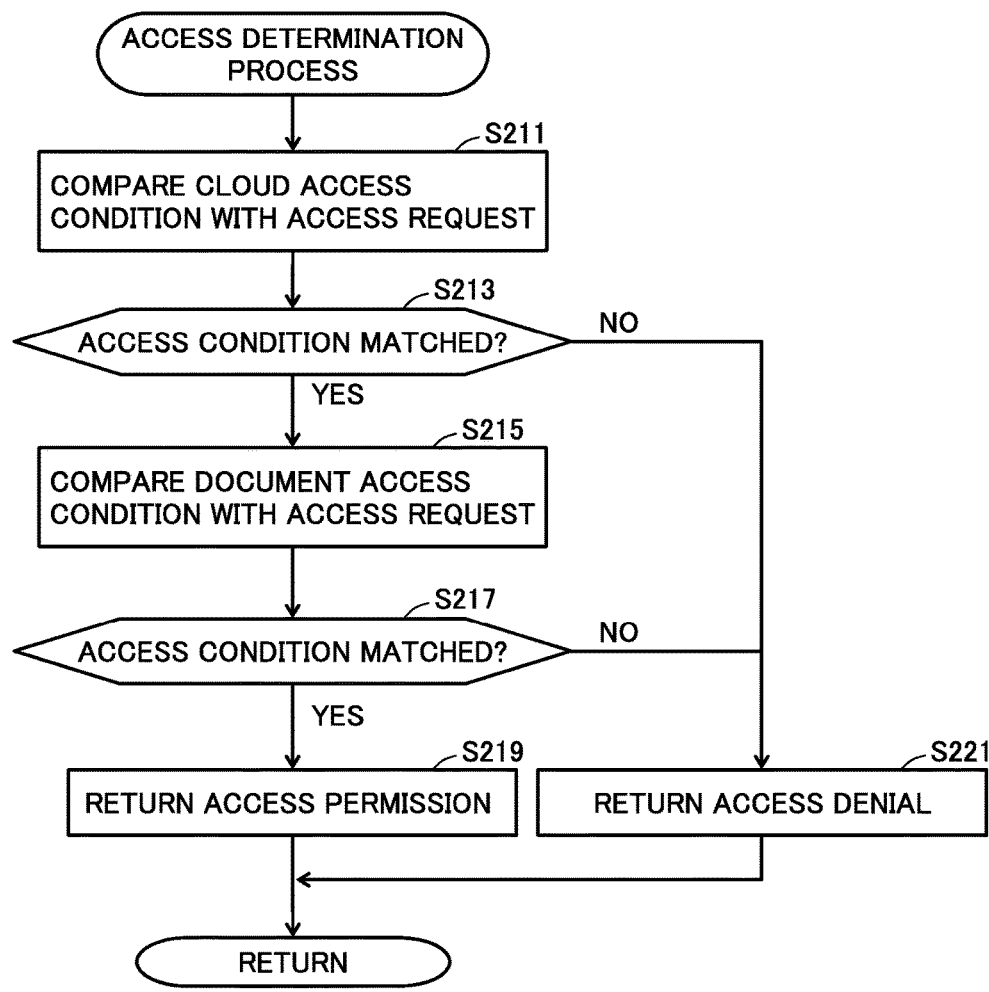

FIG. 20 is a flowchart showing an exemplary flow of process in a step S203 shown in FIG. 19.

Figure 21:
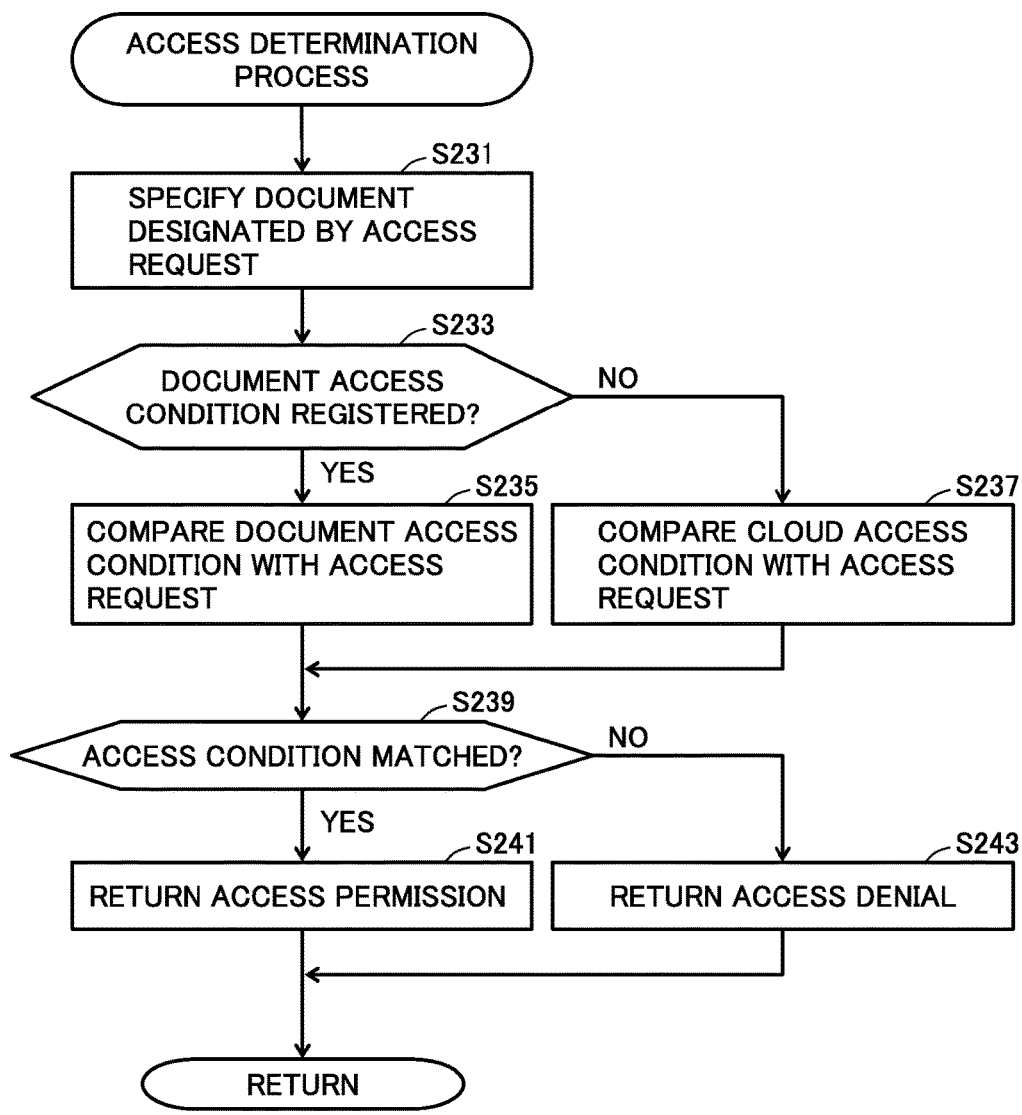

FIG. 21 is a flowchart showing another exemplary flow of process in step S203 shown in FIG. 19.

Figure 22:
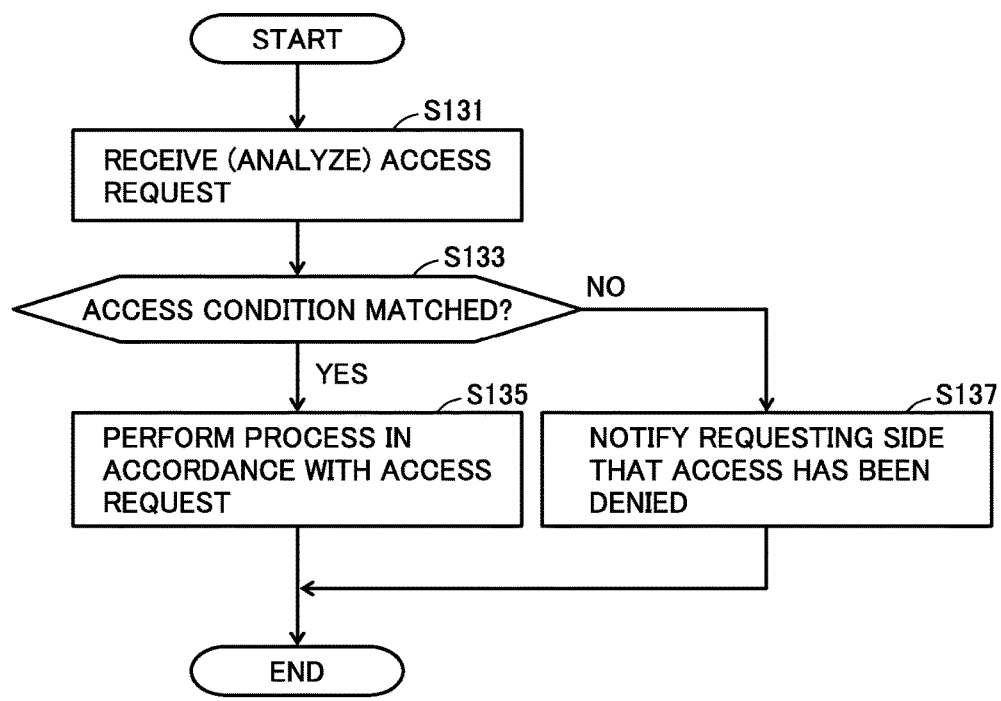

FIG. 22 is a flowchart showing a flow of process performed in response to the access request in the MFP.

DESCRIPTION OF THE PREFERRED EMBODIMENTS

The following describes an embodiment of the present invention with reference to figures. In the following description, the same parts and components are given the same reference characters. Their names and functions are also the same. Hence, they are not described repeatedly.

<System Configuration>

Figure 1:
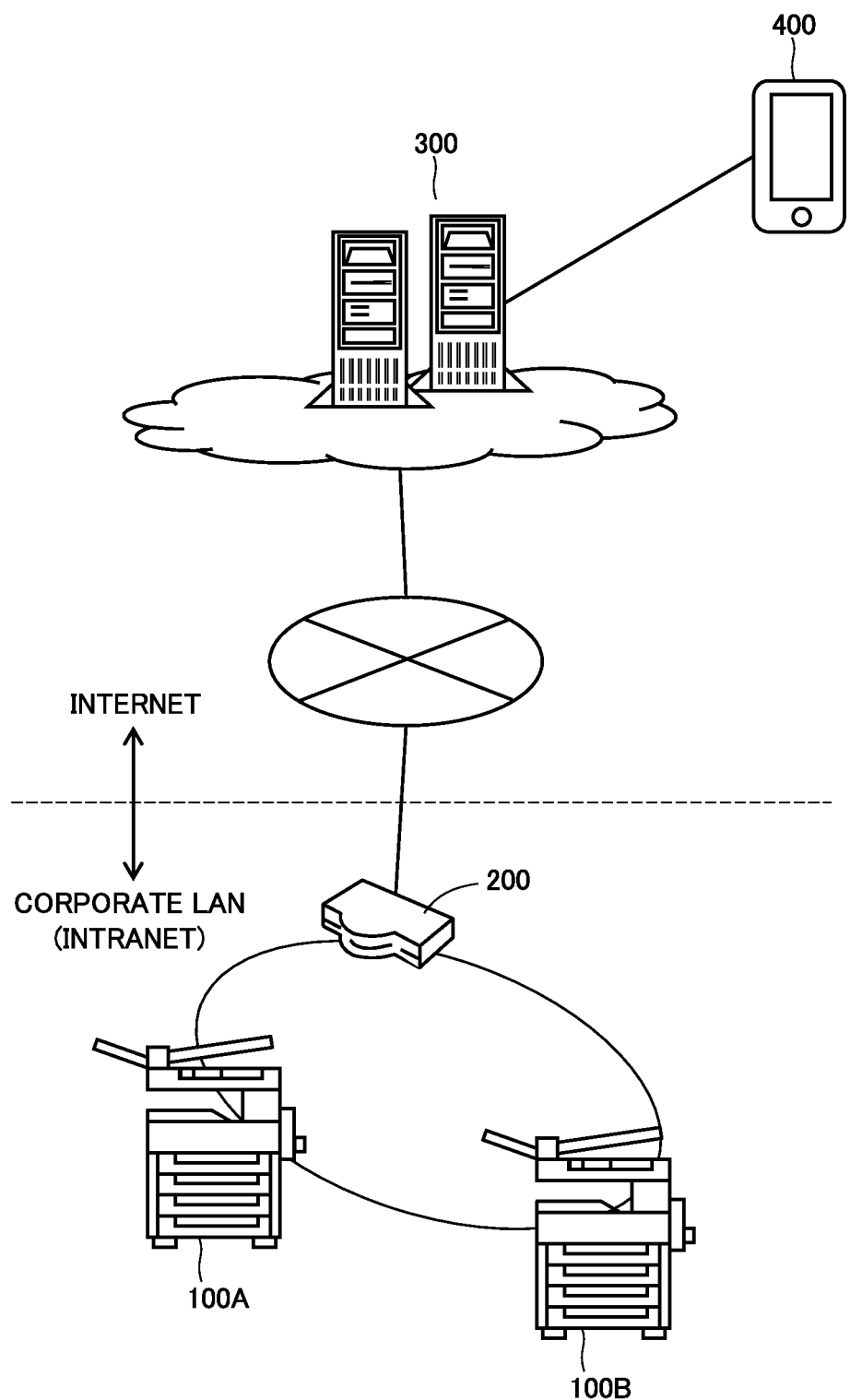
FIG. 1 shows a specific example of a configuration of an image processing system (hereinafter, "system") according to an embodiment.

FIG. 1 shows a specific example of a configuration of an image processing system (hereinafter, "system") according to the present embodiment. Referring to FIG. 1, the present system includes: MFPs (Multi-Functional Peripherals) 100A, 100B (representatively referred to as "MFPs 100") each serving as one example of an image formation apparatus; and a relay device 200 electrically connected to MFPs 100. The present system is a system constructed in a specific area such as a corporate LAN (Local Area Network), and corresponds to a network employing a protocol that does not comply with the Internet or a so-called "intranet" employing a protocol that complies with the Internet.

FIG. 1 shows an example in which the present system includes two MFPs 100 as client devices. The number of MFPs 100 is not limited to two, and may be one, or three or more. Moreover, the present system may also include a PC (personal computer) or the like as a client device.

Relay device 200 relays communication through the Internet between an internal device, which is a device included in the present system, and an external device, which is not included in the present system.

When the present system is a system called an "intranet" employing a protocol complying with the Internet, each of the client devices can use an application in cooperation with the Internet, which provides a risk such that an external device readily gains entrance thereto. In other words, there is a risk such as unauthorized access from the external device to the internal device or transfer of a computer virus. To address this, relay device 200 is provided at a boundary position between the present system and the Internet, and functions as a so-called gateway. In other words, relay device 200 ensures security for the system by receiving an access request made by an external device with respect to an internal device or an access request made by an internal device with respect to an external device and determining whether to permit or deny it. Preferably, relay device 200 also serves as a firewall.

Relay device 200 makes a request to a server 300 on the Internet for connection thereto, and maintains the communication accordingly established. When an internal device (such as MFP 100) uses a service (also referred to as "cloud service" or the like) such as an application provided by an external device, the internal device transmits, to relay device 200, an access request with respect to the external device that provides the service. When the access request matches an access condition defined in advance, i.e., when the access condition is satisfied, relay device 200 transfers, to server 300, the access request with respect to the external device. In this way, the access from the internal device to the external device is achieved.

On the other hand, for example, when a user of a mobile terminal 400 serving as an external device wishes to use MFP 100 serving as an internal device, mobile terminal 400 transmits to server 300 an access request with respect to MFP 100 in accordance with the user's operation. Server 300 transfers the access request to relay device 200. When the access request matches an access condition defined in advance, i.e., when the access condition is satisfied, relay device 200 transfers the access request from the external device to MFP 100. When the access condition is not satisfied, relay device 200 notifies that the access has been denied.

<Device Configuration>

Figure 2:
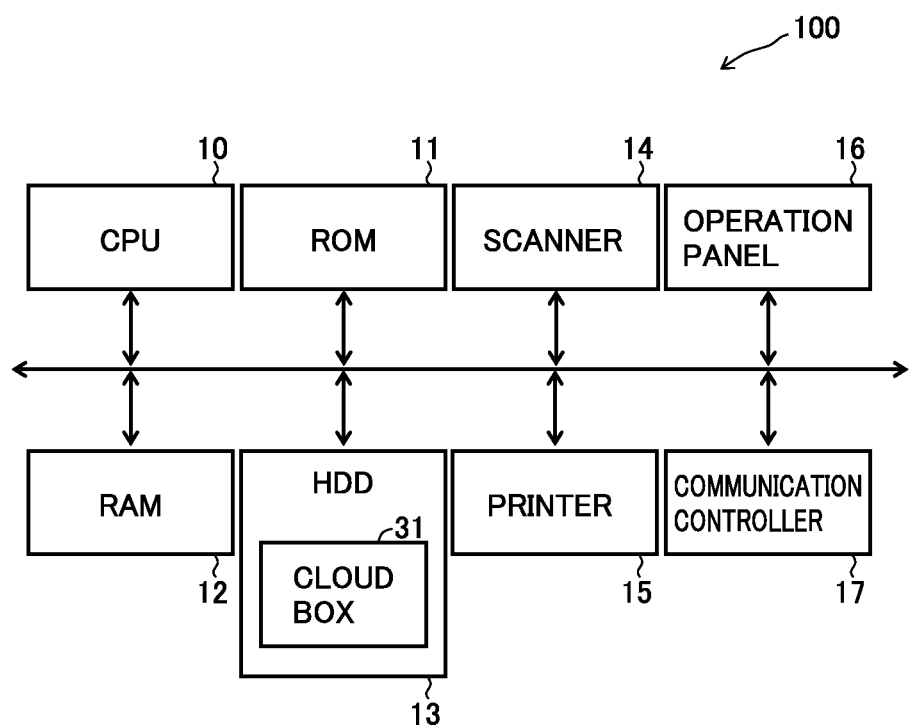
FIG. 2 is a block diagram showing a specific example of a device configuration of an MFP (Multi-Functional Peripheral) included in the system.

FIG. 2 is a block diagram showing a specific example of the device configuration of MFP 100. Referring to FIG. 2, MFP 100 includes: a CPU (Central Processing Unit) 10 for controlling the whole of the apparatus; a ROM (Read Only Memory) 11, which is a memory for storing a program or the like executed by CPU 10; a RAM (Random Access Memory) 12, which is a memory that stores a value required when executing a program by CPU 10 or that serves as a workspace when executing a program; a HDD (Hard Disk Drive) 13, which is a storage device for storing a document or the like; a scanner 14; a printer 15; an operation panel 16; and a communication controller 17 for controlling communication within the system, i.e., communication between internal devices. HDD 13 serving as one example of the memory includes a cloud box 31, which is a storage region prepared in advance for access from other devices and is accessible by other devices.

Figure 3:
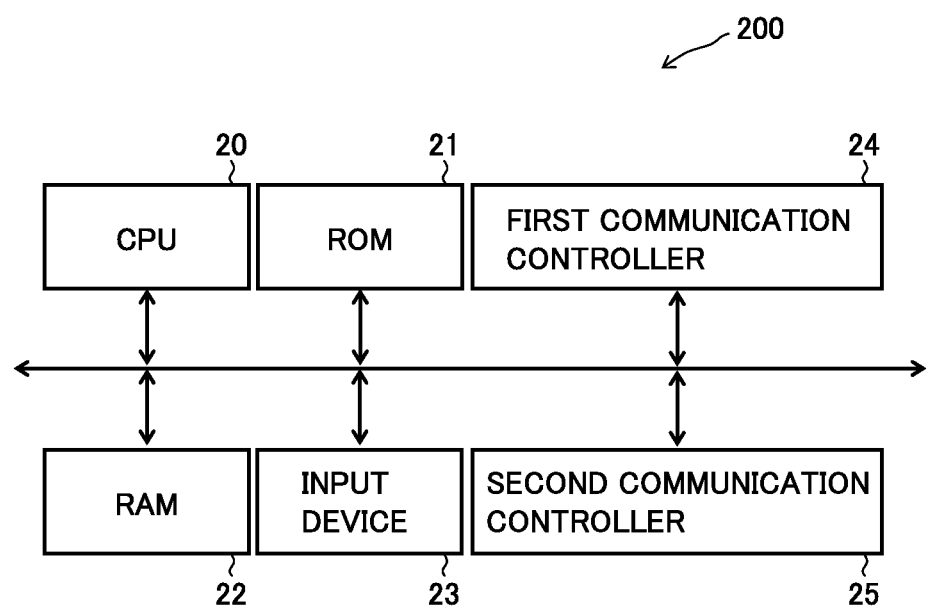
FIG. 3 is a block diagram showing a specific example of a device configuration of a relay device included in the system.

FIG. 3 is a block diagram showing a specific example of the device configuration of relay device 200. Relay device 200 can be implemented using a general computer. Hence, FIG. 3 illustrates a configuration of such a general computer.

Specifically, referring to FIG. 3, relay device 200 includes: a CPU 20 for controlling the whole of the device; a ROM 21, which is a memory for storing a program or the like executed by CPU 20; a RAM 22, which is a memory that stores various types of information or that serves as a workspace when the program is executed by CPU 20; an input device 23 such as a switch or a button; a first communication controller 24 for controlling communication within the system, i.e., communication between internal devices; and a second communication controller 25 for controlling communication with an external device through the Internet.

<Overview of Operation>

FIG. 4 shows an overview of an operation in the present system. Referring to FIG. 4, when MFP 100 receives from a user an operation of inputting (or selecting) an access condition with respect to cloud box 31, MFP 100 sets the access condition with respect to cloud box 31 in accordance with the operation (step S1). The access condition thus set is stored also in its memory.

When the access condition is set, MFP 100 transmits, to relay device 200, the access condition for an external device with respect to cloud box 31 (step S2). When relay device 200 receives from MFP 100 the access condition, relay device 200 registers the access condition in its memory (step S3).

When, for example, a mobile terminal 400 serving as the external device receives from the user an instruction for access to the internal device, mobile terminal 400 transmits an access request to relay device 200 in accordance with the instruction (step S4). In step S4, as shown in FIG. 1, by way of example, the access request is transmitted to relay device 200 via server 300.

When relay device 200 receives the access request from the external device via server 300, relay device 200 analyzes the access request (step S5). Then, relay device 200 compares the access request with the access condition registered in step S3 described above, and determines whether to permit or deny the access to MFP 100 (step S6).

When relay device 200 determines to permit the access from the external device, relay device 200 transfers the access request to MFP 100. When relay device 200 determines to deny the access, relay device 200 notifies the external device that the access has been denied (step S7).

When MFP 100 receives the access request, MFP 100 compares it with the access condition set in step S1 described above, and determines whether to permit or deny the access (step S8).

Each of FIG. 5 to FIG. 10 shows a specific example of a display screen in MFP 100 when setting the access condition in step S1. Specifically, when the user instructs to display a screen for checking a box in a main screen, a screen such as one shown in FIG. 5 is displayed on operation panel 16 of MFP 100, for example. The screen of FIG. 5 presents a content of each box prepared in MFP 100. The term "box" refers to a storage region to which access is permitted in advance only to registered users (or user group). In the example of FIG. 5, the registered users for "BOX 3" are "CLOUD", which indicates that BOX 3 is a cloud box which an external device can access.

Moreover, the screen of FIG. 5 selectively presents the boxes. In the example of FIG. 5, when the user touches a box name such as "BOX 1", the screen transitions to a screen of FIG. 6 that displays a list of documents stored in the box having been touched.

Furthermore, the screen of FIG. 5 presents a button for receiving an instruction regarding a setting on each box. In FIG. 5, by way of example, a "setting" button is presented for each box. The screen of FIG. 5 may present such a "setting" button only for a box for which settings can be made, and a box for which settings cannot be made may be grayed out. When the user touches one of the "setting" buttons on the screen of FIG. 5, the screen transitions to a screen for receiving a setting item, which is not shown in the figure, for the corresponding box. By touching an "access condition setting" button therein, the screen transitions to a screen of FIG. 7 for inputting an access condition with respect to the box.

In step S1, the access condition for the external device can be set as the access condition with respect to cloud box 31. The access condition for the external device with respect to cloud box 31 serves as a first access condition and is referred to as a "cloud access condition".

Figure 7:
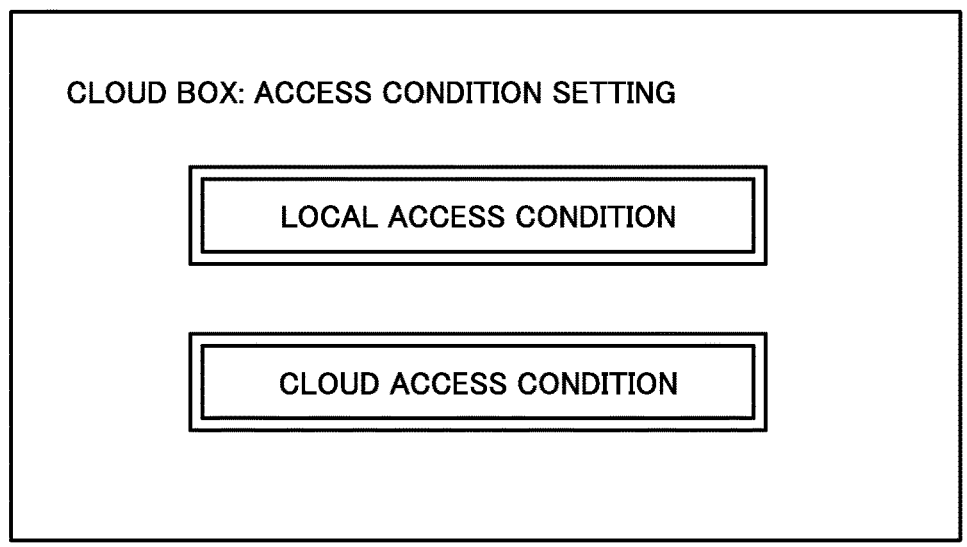

Preferably, in step S1, as the access condition for the internal device with respect to cloud box 31, an access condition for an internal device can be also set. The access condition for the internal device with respect to cloud box 31 serves as a second access condition and is referred to as a "local access condition". In the screen of FIG. 7, the user can select a setting screen for access condition from the local access condition and the cloud access condition.

Figure 8:
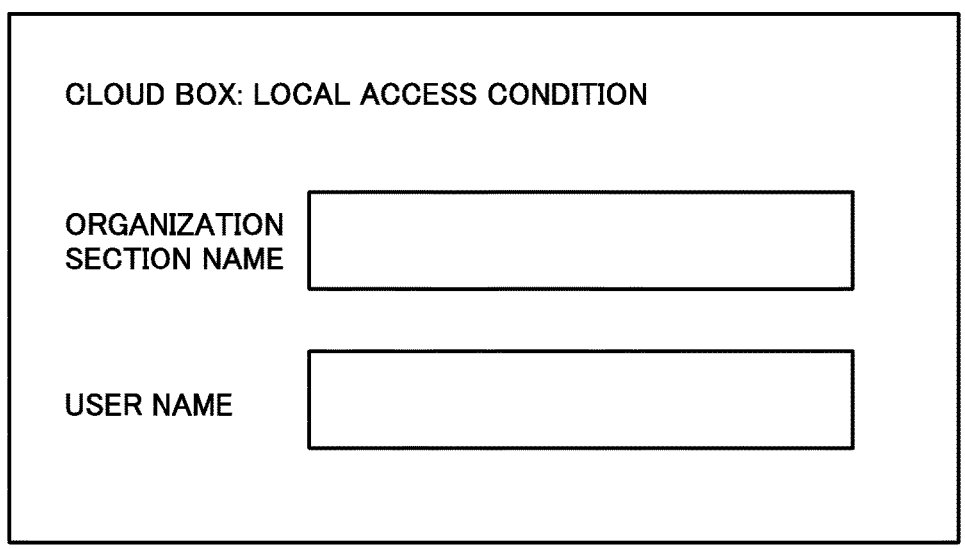

In the screen of FIG. 7, when the user touches the "local access condition" button, the screen transitions to a setting screen of FIG. 8. The setting screen of FIG. 8 receives a condition for an internal device to be permitted in access to cloud box 31. The local access condition includes items such as: information (such as a user name) for specifying a login user for the internal device to be permitted in access to cloud box 31; and information for specifying a group (such as an organization section) to which the device belongs. The local access condition may include other items such as an accessible period (such as a time period or days of week). The local access condition thus set is stored in the memory.

In the screen of FIG. 7, when the user touches the "cloud access condition" button, the screen transitions to a setting screen of FIG. 9. The setting screen of FIG. 9 receives a condition for an external device to be permitted in access to cloud box 31. The cloud access condition includes items such as: information (such as a cloud service name) for specifying an application executed by an external device to be permitted in access to cloud box 31; information (such as a user name) for specifying a login user; information for specifying a group (such as an organization section) to which the device belongs; and an accessible period (such as a time period or days of week). The cloud access condition thus set is stored in the memory, is then transmitted from MFP 100 to relay device 200 in step S2, and is then registered in relay device 200 in step S3.

The cloud access condition is used for the access determination performed by relay device 200 in step S6. The local access condition is used for the access determination performed by MFP 100 in step S8.

Preferably, an access condition for an external device with respect to each of documents stored in cloud box 31 may be settable. In other words, it can be also said that the cloud access condition described above is an access condition for an external device with respect to each of the documents. When the cloud access condition can be set with respect to cloud box 31 as described above, the cloud access condition thus set is applied to all the documents stored in cloud box 31. Hence, preferably, as a default setting for the cloud access condition, the cloud access condition, with respect to an individual document, is changeable.

Figure 6:
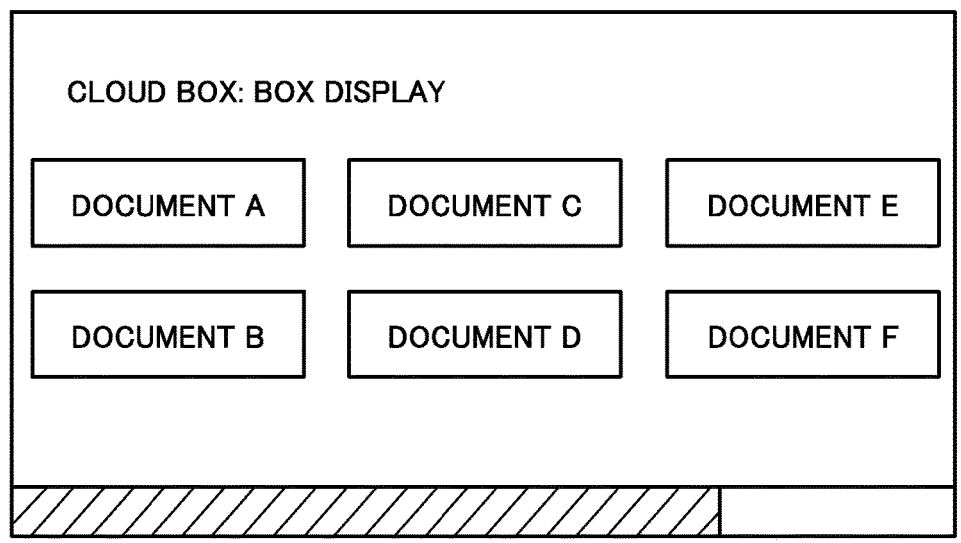

When the user selects a document in the list display screen of FIG. 6, the screen transitions to a screen for receiving a setting item, which is not shown in the figure, for the document. By touching the "access condition setting" button therein, the screen transitions to a screen of FIG. 10 for inputting an access condition for an external device with respect to the document (document A). The access condition for the external device with respect to the document in cloud box 31 serves as a third access condition and is referred to as a "document access condition". The document access condition includes items such as: permission or denial of access from an external device to the document in cloud box 31; information (such as a cloud service name) for specifying an application executed by the external device to be permitted in access to the document (in the case where the access is permitted); information for specifying a login user (such as a user name); information for specifying a group (such as an organization section) to which the device belongs; and an accessible period (such as a time period or days of week). It should be noted that the items other than the permission or denial of the access may be displayed in a grayed-out manner to disable acceptance thereof when the denial of access is set.

The document access condition may be set in MFP 100 in the same manner as the settings for other access conditions, may be stored in its memory, and may be transmitted to and registered in relay device 200. Alternatively, the document access condition may be set and registered in relay device 200. The document access condition may be used for the access determination performed by relay device 200 in step S6, or may be used for the access determination performed by MFP 100 in step S8.

<Function Configuration>

FIG. 11 and FIG. 12 are block diagrams respectively showing specific examples of function configurations of MFP 100 and relay device 200 for performing the above-described operations. Each function in FIG. 11 is realized mainly by CPU 10 of MFP 100 reading out the program stored in ROM 11 to RAM 12 and executing it. However, at least a part of the functions may be realized by other hardware configurations shown in FIG. 2 or a device configuration such as an electric circuit not shown in the figures. Each function in FIG. 12 is realized mainly by CPU 20 of relay device 200 reading out the program stored in ROM 21 to RAM 22 and executing it. However, at least a part of the functions may be realized by other hardware configurations shown in FIG. 3 or a device configuration such as an electric circuit not shown in the figures.

Referring to FIG. 11, HDD 13 serving as one example of the memory includes not only cloud box 31 described above but also a condition storage portion 32, which is a storage region for storing an access condition.

CPU 10 includes: a condition input unit 101 for receiving input of an access condition from the user based on an operation signal from operation panel 16; a setting unit 102 for setting the access condition based on the input; a transmission unit 103 for transmitting the access condition to relay device 200; a request input unit 104 for receiving access requests from internal devices including relay device 200; a determination unit 105 for determining whether to permit or deny access to cloud box 31 by comparing an access request from an internal device with the local access condition; and a processing unit 106 for performing a process, such as file transfer, for cloud box 31 in accordance with the access request when the access is permitted.

Setting unit 102 includes: a first setting unit 111 for setting the cloud access condition; and a second setting unit 112 for setting the local access condition. When the document access condition, which is an access condition for an external device with respect to a document stored in cloud box 31, can be set (changed) as described above, setting unit 102 further includes a third setting unit 113 for setting the document access condition. Preferably, when each access condition input by the user with respect to the document stored in cloud box 31 is included in the cloud access condition, third setting unit 113 sets the access condition input by the user as the document access condition.

The access condition thus set is stored in condition storage portion 32. FIG. 13 shows a specific example of the access conditions stored in condition storage portion 32 of MFP 100. As shown in FIG. 13, the cloud access condition and local access condition having been set are stored in the memory of MFP 100. When the document access condition is set, the document access condition is also stored in the memory.

Transmission unit 103 transmits the cloud access condition to relay device 200. Transmission unit 103 may transmit to relay device 200 only an access condition (item value), not included in the local access condition, of the cloud access condition. In this case, transmission unit 103 includes a transmission processing unit 131 for performing a process of retrieving the access condition to be transmitted to relay device 200. When the document access condition is set, transmission unit 103 also transmits the document access condition to relay device 200.

Transmission unit 103 may not transmit the document access condition to relay device 200. In this case, determination unit 105 determines whether to permit or deny access to the corresponding document in cloud box 31 by comparing the access request transferred from relay device 200 with the document access condition for the document.

Referring to FIG. 12, RAM 22 serving as one example of the memory of relay device 200 includes a condition storage portion 33, which is a storage region for registering (storing) access conditions for MFP 100.

CPU 20 includes: a condition input unit 201 for receiving the input of the access condition with respect to cloud box 31 from MFP 100; a registration unit 202 for registering the access condition in the memory; a request input unit 203 for receiving the access request from the external device; a determination unit 204 for determining whether to permit or deny access to cloud box 31 of MFP 100 by comparing the access request with the registered access condition when the access request is a request for access to MFP 100 that is an internal device; a transfer unit 205 for transferring the access request to MFP 100 when determination unit 204 determines to permit the access from the external device; and a notification unit 206 for notifying the external device that the access has been denied when determination unit 204 determines to deny the access from the external device.

Registration unit 202 includes a first registration unit 211 for registering the cloud access condition in condition storage portion 33. Further, when the document access condition, which is an access condition for an external device with respect to a document stored in cloud box 31, can be set (changed) as described above, setting unit 202 further includes a second setting unit 212 for registering the document access condition.

FIG. 14 shows specific examples of cloud access conditions stored in condition storage portion 33 of relay device 200. As shown in FIG. 14, for each MFP 100, the memory of relay device 200 stores the cloud access condition having been set in MFP 100 and transmitted from MFP 100. Furthermore, as shown in FIG. 14, in condition storage portion 33, MFPs 100 having cloud boxes 31 having been set to have the same cloud access condition may be formed into a group to manage them.

FIG. 15 shows specific examples of document access conditions stored in condition storage portion 33 of relay device 200. When a document access condition can be set for each document stored in cloud box 31 in MFP 100, the document access condition set in MFP 100 and transmitted from MFP 100 is stored for each document in the memory of relay device 200.

Preferably, when each document access condition received is included in the cloud access condition, second registration unit 212 registers the document access condition in the memory. That is, when there are items having the same value in the received document access condition and cloud access condition, second registration unit 212 deletes, from the document access condition, the same item as that in the cloud access condition for the purpose of management. The deleted items are indicated by "-" in the example of FIG. 15.

When the document access condition with respect to the document designated by the access request is registered in the memory, determination unit 204 determines whether to permit or deny the access to MFP 100 by comparing the access request with the document access condition. Alternatively, when determination unit 204 determines that the cloud access condition is satisfied as a result of comparing the access request with the cloud access condition, determination unit 204 may further compare the access request with the document access condition so as to determine whether to permit or deny access from the external device.

<Operation Flow>

Each of FIG. 16 to FIG. 18 is a flowchart showing a flow of process when setting the access condition in MFP 100. The operation shown in each of the flowcharts of FIG. 16 to FIG. 18 is implemented by CPU 10 of MFP 100 reading out a program stored in ROM 11 to RAM 12 and executing it so as to exhibit each of the functions of FIG. 11.

Referring to FIG. 16, when setting an access condition in MFP 100, a process of setting the access condition is performed by CPU 10 (step S101), followed by a process of transmitting the set access condition to relay device 200 (step S103).

In step S101, CPU 10 can set a local access condition on the screen of FIG. 8 and a cloud access condition on the screen of FIG. 9. When the local access condition and the cloud access condition are set in step S101, in step S103, CPU 10 preferably transmits, to relay device 200, only an access condition (item value), not included in the local access condition, of the cloud access condition, i.e., a difference between the cloud access condition and the local access condition.

FIG. 17 is a flowchart showing a flow of operation in step S103. Referring to FIG. 17, CPU 10 reads out, from the memory, the cloud access condition (condition A) and local access condition (condition B) having been set (steps S111, S113), and compares them with each other.

When the cloud access condition has an access condition included in the local access condition, i.e., when there is an item having the same value (YES in step S115), CPU 10 deletes, from the cloud access condition, the item having the same value as that of the local access condition (step S117), and transmits it to relay device 200 (step S119). Accordingly, the difference between the cloud access condition and the local access condition is transmitted from MFP 100 to relay device 200 as the cloud access condition.

On the other hand, when the cloud access condition has no item having the same value as that of the local access condition (NO in step S115), CPU 10 transmits the set cloud access condition to relay device 200 (step S119).

FIG. 18 is a flowchart showing a flow of process when setting the document access condition in step S101. Preferably, when each access condition input by the user with respect to the document stored in cloud box 31 is included in the cloud access condition, CPU 10 sets the access condition input by the user as the document access condition. That is, referring to FIG. 18, when CPU 10 receives input of the document access condition (condition C) from the user (step S121), CPU 10 reads out the cloud access condition (condition A) from the memory (step S123) and compares them with each other.

When each document access condition is included in the cloud access condition (condition A>condition C), i.e., when the document access condition has no item less strict than that of the cloud access condition (step S125), the access condition (condition C) input is set as the document access condition (step S127). It should be noted that when the document access condition input has at least one item not included in the cloud access condition (NO in step S125), CPU 10 receives the input of the document access condition from the user again and repeats the above process. Accordingly, when setting an access condition with respect to the document stored in cloud box 31, the access condition is set to be stricter than the cloud access condition, which is an access condition for an external device with respect to cloud box 31.

Each of FIG. 19 to FIG. 21 is a flowchart showing a flow of process performed in relay device 200 in response to an access request from an external device. The operation shown in each of the flowcharts of FIG. 19 to FIG. 21 is implemented by CPU 20 of relay device 200 reading out a program stored in ROM 21 to RAM 22 and executing it so as to exhibit each of the functions of FIG. 12.

Referring to FIG. 19, when receiving the access request from the external device, CPU 20 analyzes the access request (step S201). When the access request from the external device matches the cloud access condition set with respect to cloud box 31 of an MFP 100 (YES in step S203), CPU 20 transfers the access request to MFP 100 (step S205) and ends the series of operations. When the access request from the external device does not match the cloud access condition set with respect to cloud box 31 of MFP 100 (NO in step S203), CPU 20 notifies the external device that the access has been denied (step S207), and ends the series of operations.

When the document access condition is set with respect to the document stored in cloud box 31 of MFP 100, the process of FIG. 20 or the process of FIG. 21 is performed in step S203. Specifically, referring to FIG. 20, when CPU 20 compares the cloud access condition with the access request (step S211) and they match each other (YES in step S213), CPU 20 further compares the document access condition with the access request (step S215). Furthermore, when they match each other (YES in step S217), CPU 20 returns an access permission as a result of the determination (step S219). On the other hand, when the access condition does not match either one of the access conditions (NO in step S213 or NO in step S217), CPU 20 returns an access denial as a result of the determination (step S221). Accordingly, in relay device 200, when the document access condition is set with respect to the document designated by the access request, access determination is made in accordance with both the access conditions, i.e., the document access condition and the cloud access condition.

Alternatively, referring to FIG. 21, CPU 20 specifies the document designated by the access request (step S231), by analyzing the access request in step S201. When the document access condition with respect to the document is registered in the memory (YES in step S233), CPU 20 compares the access request with the document access condition (step S235).

On the other hand, when no document access condition with respect to the specified document is registered in the memory (NO in step S233), CPU 20 compares the access request with the cloud access condition (step S237). When the access request matches the document access condition or the cloud access condition (YES in step S239), CPU 20 returns an access permission as a result of the determination (step S241). When the access request does not match the document access condition or the cloud access condition (NO in step S239), CPU 20 returns an access denial as a result of the determination (step S243). Thus, in relay device 200, when the document access condition is set with respect to the document designated by the access request, access determination is made in favor of the document access condition, whereas when no document access condition is set, the access determination is made using the cloud access condition.

It should be noted that FIG. 22 is a flowchart showing a flow of process performed in MFP 100 in response to an access request. In MFP 100, whether to permit or deny access is determined only by comparing the access request with the local access condition set. Specifically, referring to FIG. 22, when CPU 10 receives an access request from relay device 200 or a different internal device, CPU 10 analyzes the access request (step S131). When the access request matches the local access condition set with respect to cloud box 31 of MFP 100 (YES in step S133), CPU 10 performs a process in accordance with the access request (step S135). When the access request does not match it (NO in step S133), CPU 10 notifies the requesting side that the access has been denied (step S137). That is, in MFP 100, irrespective of whether the access request is from an external device or from an internal device, whether to permit or deny the access is determined only through the comparison with the set local access condition.

Effect of Embodiment

In the system according to the present embodiment, the access point from the external device is limited to the predetermined storage region such as cloud box 31 while not accepting access to other storage regions. Accordingly, a process for ensuring security can be facilitated and security can be ensured.

Without setting an access condition with respect to relay device 200, the user can determine whether to permit or deny access in relay device 200 by setting the access condition for the external device with respect to cloud box 31 in the same manner as in the case of setting the local access condition. Accordingly, the settings can be facilitated. That is, the user can make security settings for the external device with respect to MFP 100 without paying attention to relay device 200, thereby achieving improvement in convenience.

Furthermore, the user can also set a security condition in relay device 200 with respect to each document stored in cloud box 31 in the same manner as in the case of setting the local access condition. In this way, more advanced security can be ensured readily.

Other Example 1

It should be noted that in the above description, each of the cloud access condition, the local access condition, and the document access condition is set in MFP 100, and the cloud access condition and the document access condition are transmitted to relay device 200. However, the device in which the setting is made and the device to which it is transmitted are not limited to this example. In other words, as another example, relay device 200 may be configured to receive a user input regarding an access condition, set each access condition, and transmit a local access condition to MFP 100. Also in this case, a similar effect can be obtained.

Other Example 2

In the description above, it is assumed that relay device 200 is a device different from and independent of MFP 100. However, as another example, relay device 200 may be included in one of MFPs 100 of the system. That is, one of MFPs 100 may be configured to also function as relay device 200. With this, a device dedicated as relay device 200 does not need to be provided in the system, so that the system can be constructed to include MFP 100 also having the function of relay device 200.

Other Example 3

Also, there can be provided a program for causing the CPU of MFP 100 or relay device 200 to perform the above-described process. In this way, the system described above can be constructed by installing a program in an existing device.

Such a program can be recorded onto a computer readable recording medium such as a flexible disk attached to a computer, a CD-ROM (Compact Disk-Read Only Memory), a ROM (Read Only Memory), a RAM (Random Access Memory) and a memory card, and can be provided as a program product. Alternatively, the program can be provided by recording it onto a recording medium such as a hard disk included in a computer. Alternatively, the program can be also provided by downloading via a network.

It should be noted that the program according to the present invention may be a program for executing a process by invoking, in a predetermined sequence at a predetermined timing, required ones of program modules provided as a part of the operating system (OS) of the computer. In such a case, the program itself does not include the modules and cooperates with the OS to execute the process. The program not including such modules can be also included in the program according to the present invention.

Moreover, the program according to the present invention may be provided with the program being incorporated in a part of a different program. Also in such a case, the program itself does not include the modules included in the different program and cooperates with the different program to execute a process. The program incorporated in the different program may also be included in the program according to the present invention.

A program product to be provided is installed in a program storage unit such as a hard disk and is executed. It should be noted that the program product includes a program itself and a recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing system comprising:
an image formation apparatus comprising a first processor;
a relay device configured to relay communication between said image formation apparatus and an external device external to the image processing system, the relay device comprising a second processor;
wherein the first processor provided in the image formation apparatus is configured to set an access condition for said external device with respect to a memory region accessible by other devices, included in said image formation apparatus wherein the memory region is prepared in advance for access from the external device and is distinguishable from an other memory region, and wherein the first processor is configured to transmit said access condition to the relay device;
wherein the second processor provided in the relay device is configured to register said access condition in a memory;
wherein the second processor is configured to receive an access request, said access request being made by said external device with respect to an internal device, which is a device included in the image processing system;
wherein the second processor is configured to determine whether to permit or deny access to said image formation apparatus by comparing said access request with said access condition when said access request is a request for access to said image formation apparatus;
wherein the second processor is configured to transfer said access request to said image formation apparatus when said second processor determines to permit the access from said external device; and
wherein the second processor is configured to notify said external device that the access has been denied when said second processor determines to deny the access from said external device.

2. A relay device for relaying communication between at least one image formation apparatus included in a system to which said relay device belongs and an external device not included in said system, the image formation apparatus comprising a memory region accessible by other devices, the relay device comprising:

a processor;

a memory;

wherein the processor provided in the relay device is configured to register at least one first access condition in the memory, said first access condition being received from the image formation apparatus, said first access condition being used for access to the memory region of said image formation apparatus, wherein the memory region is prepared in advance for access from the external device and is distinguishable from an other memory region, wherein the other memory region includes a memory region accessible by an internal device in said system;

wherein the processor is configured to receive an access request made by said external device with respect to said image formation apparatus;

wherein the processor is configured to determine whether to permit or deny access to said image formation apparatus by comparing said access request with said first access condition when said access request is a request for access to said image formation apparatus;

wherein the processor is configured to transfer said access request to said image formation apparatus when said processor determines to permit the access from said external device; and wherein the processor is configured to notify said external device that the access has been denied when said processor determines to deny the access from said external device.

3. The relay device according to claim 2, wherein the processor is configured to register at least one second access condition in said memory, said second access condition being received from the image formation apparatus, said second access condition being used for access to a document stored in said memory region, wherein when said second access condition with respect to the document designated by said access request is registered in said memory, said processor is configured to permit or deny the access to said image formation apparatus by comparing said access request with said second access condition.

4. The relay device according to claim 3, wherein said processor is configured to register said second access condition in said memory when each second access condition is included in said first access condition.

5. The relay device according to claim 2, wherein the processor is configured to register at least one second access condition in said memory, said second access condition being received from an image formation apparatus, said second access condition being used for access to a document stored in said memory region, wherein when said processor determines that said first access condition is satisfied by comparing said access request, which is a request for access to said image formation apparatus, with said first access condition, said processor is further configured to determine whether to permit or deny the access from said external device by comparing said access request with said second access condition.

6. The relay device according to claim 5, wherein said processor is configured to register said second access condition in said memory when each second access condition is included in said first access condition.

7. An image formation apparatus comprising the relay device recited in claim 2.

8. A non-transitory computer-readable storage medium storing a program causing a computer, which serves as a relay device, to perform an access management process, said relay device relaying communication between at least one internal device included in a system to which the relay device belongs and an external device not included in said system, said program causing a processor provided in said computer serving as a relay device to perform:

registering at least one first access condition in a memory, said first access condition being received from an image formation apparatus serving as said internal device, said first access condition being used for access to a memory region accessible by other devices of said image formation apparatus, wherein the memory region is prepared in advance for access from the external device and is distinguishable from an other memory region, wherein the other memory region includes a memory region accessible by an internal device in said system;

receiving an access request made by said external device with respect to said internal device;

determining whether to permit or deny access to said image formation apparatus by comparing said access request with said first access condition when said access request is a request for access to said image formation apparatus; and transferring said access request to said image formation apparatus when it is determined to permit the access from said external device, and notifying said external device that the access has been denied when it is determined to deny the access from said external device.

* * * * *